Feb. 20, 1945.   W. B. RANNEY   2,370,072
WRAPPING MACHINE
Filed Feb. 9, 1944   2 Sheets-Sheet 1
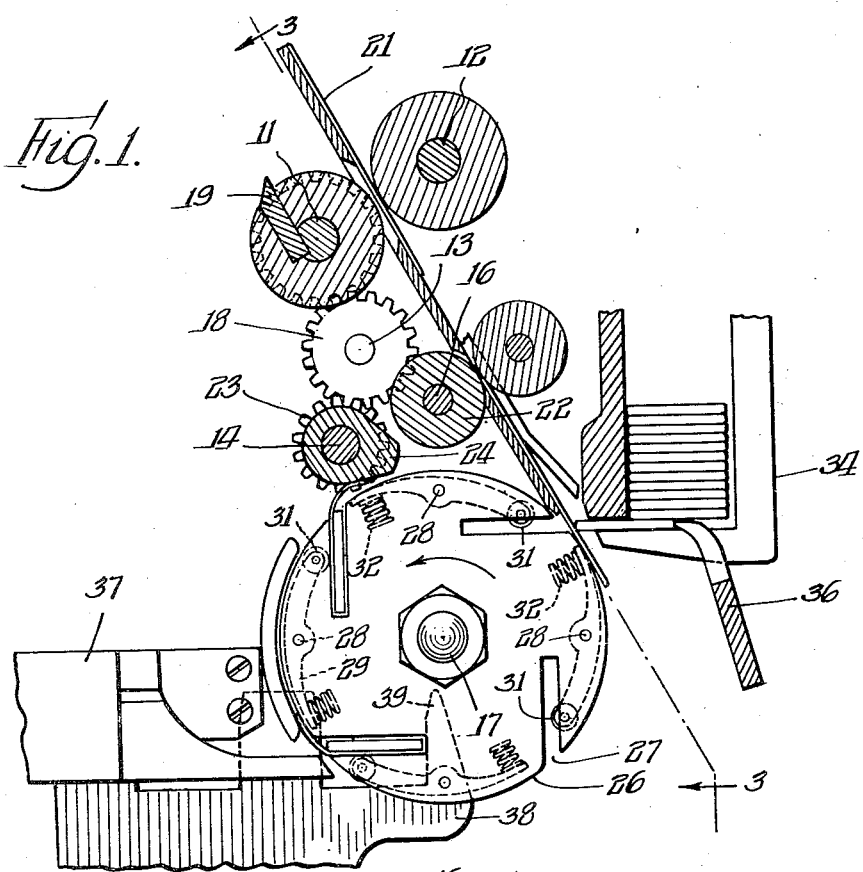
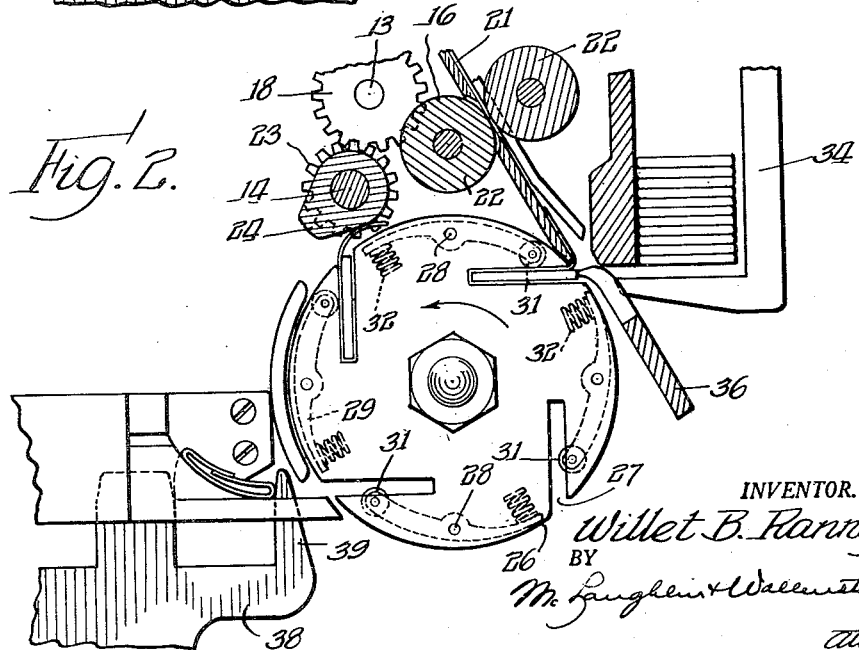
INVENTOR.
Willet B. Ranney
BY
McLaughlin & Wallenstein
attys.

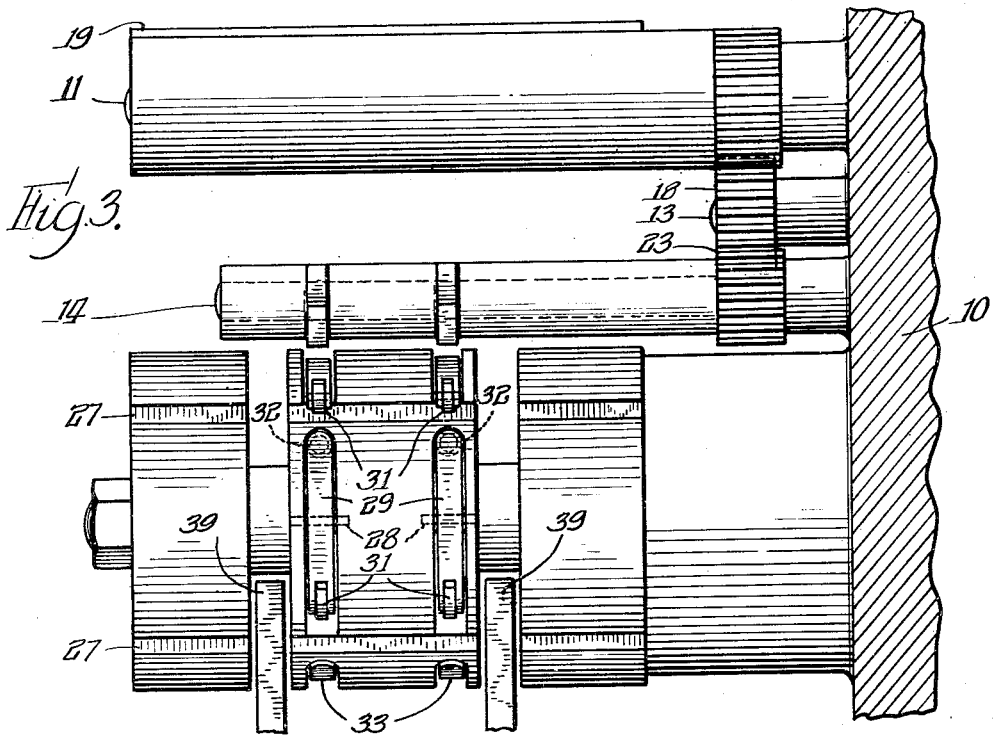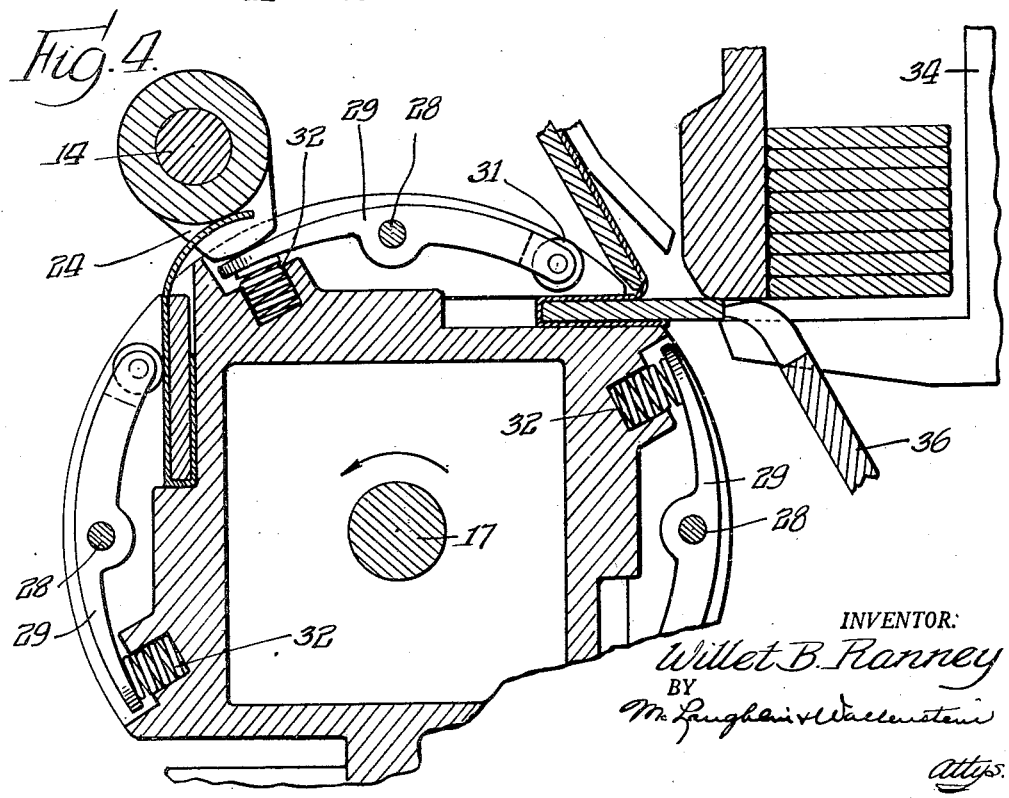

Patented Feb. 20, 1945

2,370,072

UNITED STATES PATENT OFFICE 2,370,072

WRAPPING MACHINE

Willet B. Ranney, Chicago, Ill., assignor to Wm. Wrigley Jr. Company, Chicago, Ill., a corporation of Delaware Application February 9, 1944, Serial No. 521,614

4 Claims. (Cl. 93—2)

This invention relates to wrapping machines and particularly to machines intended for wrapping at very high speed such articles as gum sticks.

In wrapping machines of the type disclosed in Smith et al. Patent No. 2,276,744, a so-called tumbling box is provided with a plurality of gum receiving pockets and is successively advanced to a plurality of positions at each of which a stick of gum or the like is introduced into one of such gum receiving pockets, while another partially wrapped stick of gum is concomitantly being withdrawn from another of such pockets. The construction and arrangement is such that as a gum stick is removed from a magazine and advanced into one of such gum receiving pockets a paper wrapper is introduced between the pocket and advancing stick of gum so that on delivery to the pocket the paper wrapper is partly wrapped around the gum stick; and as the gum stick is transported from the pocket a trailing flap of the wrapper is folded into position and the individual partly wrapped gum stick is delivered to a folding channel for folding back the ends of the wrapper. In order to maintain the gum stick in position as the tumbling box is intermittently rotated at high speed, a system of bell crank levers called dogs in the Smith patent, but more appropriately styled nippers, are provided. The usual practice, as disclosed in the Smith patent, is to spring press the nippers in a direction to cause rollers carried at one end thereof to engage the gum stick; and to prevent the rollers from entering too far into the gum stick receiving pockets, pins are ordinarily carried by the nippers and positioned to act as stops by engaging a contiguous portion of the frame of the tumbling box.

Considerable difficulty has attended the use of a nipper arrangement of the character described when operating gum wrapping machines such as shown in the Smith et al. patent at high speeds. In order positively to support a gum stick in position it is essential that the compression of the spring be sufficient to cause the rollers to engage the surface of the gum stick with a fair amount of pressure. I have found that if adequate spring pressure is provided to hold the gum stick in position and the rollers are permitted to project partly into the path of a gum stick as it is being inserted into a pocket, the gum sticks are frequently shattered instead of being caused to enter the pockets in the intended manner. The result is that under circumstances in which the action of the nippers is most required to permit proper functioning of the wrapping machine in the manner described, the conventional design causes a failure of operation which I have found to be due entirely to the action of the nippers.

The principal object of my invention is the provision of an improved wrapping machine.

Another object is to improve the operation of gum wrapping machines of the type disclosed in prior Patent No. 2,276,744.

Still another object is to improve the operation of the tumbling box assembly, particularly that tumbling box assembly in which the totally unwrapped single gum stick is initially assembled with the inner wrapper.

A further object is to positively control the gripping action of nippers of the type and under the circumstances described.

Other objects and features of the invention will be apparent from a consideration of the following detailed description taken with the accompanying drawings wherein—

Fig. 1 is a fragmentary elevational view partly in section showing a portion of a wrapping machine including a gum stick magazine, tumbling box, gum stick injector and ejector mechanism, and mechanism associated therewith, the parts being in the position which they occupy just before a gum stick is completely withdrawn from a magazine and inserted into a tumbling box pocket;

Fig. 2 is a fragmentary elevational view, partly in section, the view being similar to Fig. 1 but showing the position of the parts after a gum stick has been inserted into a pocket;

Fig. 3 is an irregular fragmentary transverse view of a portion of a gum wrapping machine, the view substantially being an elevation looking at the right hand side of Fig. 1, approximately along the line 3—3 thereof; and Fig. 4 is an enlarged fragmentary sectional view taken through the tumbling box, the view showing the parts at a position intermediate in the operating cycle between the position of Fig. 1 and the position of Fig. 2.

For the convenience of those skilled in the art, I have shown the machine parts substantially in the form in which they appear in previously referred to Patent No. 2,276,744 in order that they may be able readily to associate that portion of the wrapping machine shown in the drawings with a complete machine such as shown in said patent. Those parts of the wrapping machine not here shown may, if desired, be identical with those shown in the said Smith et al. patent, the said parts being the machine frame, the drive mechanism, the bearing arrangement, and successive operating stages following the preliminary wrapping stage shown in the present drawings. By confining the drawings only to those parts essential to an understanding of the improvements of my present invention, said understanding thereof is facilitated.

Referring now to the drawings:

The wrapping machine of my present invention has a suitable frame 10 in which shafts 11, 12, 13, 14, 16 and 17 are journalled. These shafts are connected by gears in the general manner indicated, including an idler gear 18, and are so related to the operation of the machine that all of the parts operate together in accordance with a definite operating cycle. The timing is calculated from a shaft 11 carrying a knife 19 which suitably cuts the paper web 21 before it is delivered to a wrapper chute and positively driven into position by a friction roller 22 carried on shaft 16. Included in the same gear train and timed from shaft 11 is a gear 23, this gear driving shaft 14 which carries cams 24. Thus the cam carrying shaft 14 is timed with shaft 11 and hence with other operating parts of the machine; and by controlling accurately the position of cams 24, which, as will be described, control the operation of the nippers, the nippers may be caused to operate positively to withdraw gum stick engaging rollers out of the path of a gum stick as it is being delivered to a pocket of the tumbling box.

The tumbling box 26 shown on the drawings has four gum receiving pockets 27. Between the pockets, pintles 28, carried by the tumbling box, fulcrum nippers 29, carrying on their forward ends rollers 31, and having tail pieces engaged by compression springs 32, also carried by the tumbling box. There may be, as indicated, two nippers for each pocket 27. As appears particularly clear from Fig. 3, the tumbling box has edge recesses 33 in which the nippers are housed, and that the rollers 31 may be projected down through said edge recesses into a communicative pocket 27 as shown in Figs. 1 and 3. The tail pieces of the nippers 29 are forced by the springs 32 into the path of the cams 24, and the cams 24 are also so shaped that they may enter the edge recesses 33 and engage the tail pieces of the nippers at one point in the cycle.

The parts are so constructed and arranged that if a gum stick receiving pocket is empty and the two associated nippers are not engaged by their cams 24, the rollers 31 will be projected into the associated pocket 27 partly in the path of a gum stick, such as indicated by the position of the uppermost nipper 29 appearing in Fig. 1; but immediately before a gum stick in process of being injected into the pocket strikes the rollers, the cams 24 engage the tail pieces of the nippers, partially rotates them about their fulcra in a counterclockwise direction (see Fig. 2) and withdraws them substantially entirely from the gum receiving pocket. The cams 24 substantially immediately release the nippers, and before the tumbling box has again started to rotate the tail pieces of the nippers have been released by the cams 24 and the rollers 31 are permitted to engage the inserted gum stick in the manner indicated in Fig. 4.

Those skilled in the art will understand that the improvements of my present invention may be utilized with various types of apparatus, and regardless of the specific manner of bringing the gum stick to the tumbling box pocket, removing it therefrom, and treating the partially wrapped stick afterward. In order, however, to illustrate a complete operation, I have shown a gum stick magazine 34 carrying a plurality of gum sticks S, and for the purpose of removing the lowermost stick from the magazine and delivering it to a gum stick receiving pocket, I have shown only a gum stick engaging finger 36 of a suitable stick ejector and feeding mechanism. The wrapper cut from the web 21 is indicated in the several views by the reference character W. I have also indicated generally in the drawings a folding channel 37 for folding the ends of the wrapper, and have indicated a portion of a transport mechanism 38, including a finger 39 for withdrawing the partially wrapped gum stick from the gum receiving pocket and advancing it to and through the folding channel. As shown particularly in Fig. 3, the tumbling box is provided with annular channels for receiving the fingers 39, and the drawings show two nippers for each gum stick receiving pocket, and the channels for removing the fingers 39 are disposed on opposite sides thereof. This is an illustrative arrangement common in machines of this character but is not essential to the use of my improvements herein described.

The operation of the gum wrapping machine as described is as follows:

As the tumbling box comes to rest with one gum stick pocket in gum stick receiving position and another in ejecting position, the wrapper W, which has been cut by knife 19 from the web 21, is delivered at a relatively high rate of speed to a position in the path of a gum stick, and simultaneously, but for just a very short period of time, the cams 24 engage the tail pieces of the nippers and raise the rollers 31 substantially out of the path of a gum stick. A gum stick is delivered into the pocket in such a manner that the wrapper W is partially folded around it and substantially immediately the cams 24 release the nippers and rotation of the tumbling box is resumed in a direction indicated by the arrows. The cycle is repeated as the next pocket is delivered to gum receiving position.

As one pocket is receiving a gum stick, a partially wrapped gum stick is being removed from another pocket and delivered to the folding channel. This gum stick is removed without in any way releasing the nippers, as I have found it to be sufficient to permit the gum stick to be removed while the rollers are even in fairly high compression against the surface of the stick. The nippers are required to be positively actuated, therefore, in only the gum stick receiving position, and then for only a brief instant while the gum stick is being initially inserted.

The Smith et al. patent referred to hereinabove describes and claims timing features with which my invention is not concerned, but which may appear to be at variance with the timing aspects of my present invention as described above. Smith et al. pointed out, for example, that before the tumbling box has come to a complete stop the gum stick is being introduced into a tumbling box pocket. Those skilled in the art will understand that when I refer to the gum stick being introduced and the nippers positively actuated while the tumbling box is in stationary position, I employ the term stationary in only a general sense, it being understood that the features permitting relatively very high speeds, discussed in the Smith et al. patent, may be employed with very great advantage in a wrapping machine utilizing the features of my present invention. While my invention is particularly adapted to the wrapping of gum sticks, and especially to applying the first wrapper to the otherwise unwrapped single gum stick, it may be employed in any situation where the same problems are involved, whether the articles be wrapped singly or in multiple, or whether the articles be gum sticks or generally similar articles subject to shattering under the conditions described.

With respect to the matter of timing I wish to point out that the primary essential is that the nippers be positively actuated as the leading edge of the gum stick will not contact the rollers. When the leading edge of a gum stick has passed the rollers, the principal danger of shattering has been obviated and the nippers may be released immediately. The nippers should be released in any event before rotation of the tumbling box has been resumed.

What I claim as new and desire to protect by Letters Patent of the United States is:

1. In a wrapping machine, a tumble box having article receiving pocket therein, a nipper carried by the tumbling box and having an article engaging portion extending into said pocket, means for delivering an article to said pocket, and means for withdrawing said nipper from said pocket as said article is delivered thereto, and immediately releasing said nipper and permitting it to engage said article when the said article has been advanced part way within said pocket and before rotational movement of the tumbling box has been initiated.

2. In a wrapping machine, a tumbling box having article receiving pockets therein, said tumbling box being adapted to be intermittently rotated one pocket position at a time, an article magazine, means for delivering an article from said magazine to a pocket disposed at article receiving position, means carried by the tumbling box and engaging said article to retain it in the pocket during rotation of the tumbling box, and means for inactivating said article engaging means as the said article is being inserted into said pocket and before rotational movement of the tumbling box has been initiated.

3. In a wrapping machine, a tumbling box having article receiving pockets therein, said tumbling box being adapted to be intermittently rotated one pocket position at a time, an article magazine, means for delivering an article from said magazine to a pocket disposed at article receiving position, a nipper pivoted to said tumbling box intermediate its ends, one such end carrying a roller adapted to engage an article, and another such end comprising a tail piece, spring means engaging said tail piece to rock said nipper about its pivot and cause said roller to engage an article, and cam means exterior of the tumbling box for engaging said tail piece to rock said nipper and remove the roller out of the path of the article at least before the said article passes the roller during its insertion, said cam means functioning to release the said tail means and permit the roller to engage the article before rotation of the tumbling box is initiated.

4. In a wrapping machine, a tumbling box having article receiving pockets therein, said tumbling box being adapted to be intermittently rotated one pocket position at a time, an article magazine, means for delivering an article from said magazine to a pocket disposed at article receiving position, a nipper pivoted to said tumbling box intermediate its ends, one such end carrying a roller adapted to engage an article, and another such end comprising a tail piece, spring means engaging said tail piece to rock said nipper about its pivot and cause said roller to engage an article, and cam means engaging said tail piece to rock said nipper and remove the roller out of the path of the article at least before the said article passes the roller during its insertion, said cam means releasing said tail piece at least before rotation of the tumbling box is again initiated after insertion of the said article.

WILLET B. RANNEY.